US00RE36382E

United States Patent [19]

Hultin-Stigenberg

[11] E Patent Number: Re. 36,382

[45] Reissued Date of Patent: Nov. 9, 1999

[54] PRECIPITATION HARDENABLE MARTENSITIC STAINLESS STEEL

[75] Inventor: Anna Hultin-Stigenberg, Sandviken, Sweden

[73] Assignee: Sandvik AB, Sandviken, Sweden

[21] Appl. No.: 08/923,455

[22] PCT Filed: Oct. 2, 1992

[86] PCT No.: PCT/SE92/00688

§ 371 Date: Mar. 3, 1994

§ 102(e) Date: Mar. 3, 1994

[87] PCT Pub. No.: WO93/07303

PCT Pub. Date: Apr. 15, 1993

Related U.S. Patent Documents

Reissue of:

[64] Patent No.: 5,512,237
Issued: Apr. 30, 1996
Appl. No.: 08/199,296
Filed: Oct. 2, 1992

[30] Foreign Application Priority Data

Oct. 7, 1991 [SE] Sweden ..... 9102889

[51] Int. Cl.[6] ..... C22C 38/42

[52] U.S. Cl. ..... 420/49; 420/38

[58] Field of Search ..... 148/326, 327; 420/38, 39, 49

[56] References Cited

U.S. PATENT DOCUMENTS 4,378,246 3/1983 Hoshino et al. .
4,902,472 2/1990 Isobe et al. .
5,000,912 3/1991 Bendel et al. .

FOREIGN PATENT DOCUMENTS 2145734 4/1985 United Kingdom ..... 420/49

OTHER PUBLICATIONS

Patent Abstracts of Japan, vol. 12, No. 387, C536, Abstract of JP63–134648, (Kobe Steel Ltd) Jun. 7, 1988.

Patent Abstracts of Japan, vol. 12, No. 283, C518, Abstract of JP63–62849, (Kobe Steel Ltd), Mar. 19. 1988.

*Primary Examiner*—Deborah Yee
*Attorney, Agent, or Firm*—Burns, Doane, Swecker & Mathis, L.L.P.

[57] ABSTRACT

Precipitation hardenable martensitic stainless steel of high strength combined with high ductility. The Iron-based steel comprises of about 10 to 14% chromium, about 7 to 11% nickel, about 0.5 to 6% molybdenum, up to 9% cobalt, about 0.5% to 4% copper, about 0.4 to 1.4% titanium, about 0.05 to 0.6% aluminium, carbon and nitrogen not exceeding 0.05% with iron as the remainder and all other elements of the periodic table not exceeding 0.5%.

60 Claims, No Drawings

PRECIPITATION HARDENABLE MARTENSITIC STAINLESS STEEL

Matter enclosed in heavy brackets [ ] appears in the original patent but forms no part of this reissue specification; matter printed in italics indicates the additions made by reissue.

BACKGROUND OF THE INVENTION

The present invention is concerned with the precipitation-hardenable martensitic chromium-nickel stainless steels, more especially those which are hardenable in a simple heat-treatment. More particularly, the concern is with the martensitic chromium-nickel stainless steels which are hardened by a simple heat-treatment at comparatively low temperature.

SUMMARY OF THE INVENTION

One of the objects of the invention is the provision of a martensitic chromium-nickel stainless steel which works well not only in a steelplant during e.g. rolling and drawing but also in the form of rolled and drawn products, such as strip and wire, readily lends itself to a variety of forming and fabrication operations, such as straightening, cutting, machining, punching, threading, winding, twisting, bending, and the like.

Another object is the provision of a martensitic chromium-nickel stainless steel which not only in the rolled or drawn condition but also in a hardened and strengthened condition offers very good ductility and toughness. A further object of the invention is the provision of a martensitic chromium-nickel stainless steel which, with its combination of very high strength and good ductility, is suitable for forming and fabrication of products such as springs, fasteners, surgical needles, dental instruments, and other medical instruments, and the like.

Other objects of the invention will in part be obvious and in part pointed out during the course of the following description.

DETAILED BACKGROUND OF PREFERRED EMBODIMENTS

Presently, many types of alloys are used for the forming and fabrication of the above mentioned products. Some of these alloys are martensitic stainless steels, austenitic stainless steels, plain carbon steels and precipitation-hardenable stainless steels. All these alloys together offer a good combination of corrosion resistance, strength, formability and ductility, but one by one they have disadvantages and can not correspond to the demands of today and in future on alloys used for the production of the above mentioned products. The demands are better material properties both for the end-user of the alloy, i.e. higher strength in combination with good ductility and corrosion resistance, and for the producer of the semi-finished products, such as strip and wire, and the producer of the finished products, mentioned above, i.e, properties such as e.g. that the material readily can be formed and fabricated in the meaning that the number of operations can be minimized and standard equipment can be used as long as possible, for the reduction of production cost and production time.

Martensitic stainless steels, e.g. the AISI 420-grades, can offer strength, but not in combination with ductility. Austenitic stainless steels, e.g. the AISI 300-series, can offer good corrosion-resistance in combination with high strength and for some applications acceptable ductility, but to achieve the high strength a heavy cold-reduction is needed and this means that also the semifinished product must have a very high strength and this further means that the formability will be poor. Plain carbon steels have a low corrosion resistance, which of course is a great disadvantage if corrosion resistance is required. For the last group. precipitation—hardenable stainless steels, there are numerous different grades and all with a variety of properties. However, they do have some things in common, e.g. most of them are vacuum—melted in a one-way or more commonly a two-way process in which the second step is a remelting under vacuum—pressure. Furthermore a high amount of precipitation—forming elements such as aluminium, niobium, tantalum and titanium is required and often as combinations of these elements. With "high" is meant >15% A high amount is beneficial for the strength, but reduces the ductility and formability. One specific grade that is used for the above mentioned products and which will be referred to in the description is according to U.S. Pat. No. 3.408,178, now expired. This grade offers an acceptable ductility in the finished product, but in combination with a strength of only about 2000N/mm$^2$. It also has some disadvantages during production of semi-finished products, e.g. the steel is susceptible to cracking in annealed condition.

A purpose with the research was therefore to invent a steel-grade which is superior to the grades discussed above. It will not require vacuum-melting or vacuum-remelting, but this can of course be done in order to achieve even better properties. It will also not require a high amount of aluminium, niobium, titanium, or tantalum or combinations thereof, and yet it will offer good corrosion resistance, good ductility, good formability and in combination with all this, an excellent high strength, up to about 2500–3000 N /mm$^2$ or above, depending on the required ductility.

It is therefore an object of the invention to provide a steel alloy which will meet the requirements of good corrosion resistance, high strength in the final product and high ductility both during processing and in the final product. The invented steel grade should be suitable to process in the shape of wire, tube, bar and strip for further use in applications such as dental and medical equipment, springs and fasteners.

The requirement of corrosion resistance is met by a basic alloying of about 12% chromium and 9% nickel. It has been determined in both a general corrosion test and a critical pitting corrosion temperature test that the corrosion resistance of the invented steelgrade is equal to or better than existing steelgrades used for the applications in question.

With a content of copper and especially molybdenum higher than 0.5%, respectively, it is expected that a minimum of 10% or usually at least 11% chromium is necessary to provide good corrosion resistance. The maximum chromium content is expected to be 14% or usually at the most 13%, because it is a strong ferrite stabilizer and it is desirable to be able to convert to austenite at a preferably low annealing temperature, below 1100° C. To be able to obtain the desired martensitic transformation of the structure, an original austenitic structure is required. High amounts of molybdenum and cobalt, which have been found to be desirable for the tempering response, result in a more stable ferritic structure and therefore, the chromium content should be maximized at this comparatively low level.

Nickel is required to provide an austenitic structure at the annealing temperature and with regard to the contents of ferrite stabilizing elements a level of 7% or usually at least 8% is expected to be the minimum. A certain amount of nickel is also forming the hardening particles together with the precipitation elements aluminium and titanium. Nickel is a strong austenite stabilizer and must therefore also be maximized in order to enable a transformation of the structure to martensite on quenching or at cold working. A maximum nickel level of 11% or usually at the most 10% is expected to be sufficient. Molybdenum is also required to provide a material that can be processed without difficulties. The absence of molybdenum has been found to result in a susceptibility to cracking. It is expected that a minimum content of 0.5% or often 1.0% is sufficient to avoid cracking, but preferably the content should be exceeding 1.5%. Molybdenum also strongly increases tempering response and final strength without reducing the ductility. The ability to form martensite on quenching is however reduced and it has been found that 2% is sufficient and 4% insufficient. Using this much molybdenum cold-working is required for martensite formation. It is expected that 6% or often 5% is a maximum level of molybdenum to be able to get sufficient amount of martensite in the structure and consequently also desired tempering response, but preferably the content should be less than about 4.5%.

Copper is required to increase both the tempering response and the ductility. It has been found that an alloy with about 2% copper has very good ductility compared with alloys without an addition of copper. It is expected that 0.5% or often 1.0% is sufficient for obtaining good ductility in a high strength alloy. The minimum content should preferably be 1.5%. The ability to form martensite on quenching is slightly reduced by copper and together with the desired high amount of molybdenum it is expected that 4% or often 3% is the maximum level for copper to enable the structure to convert to martensite, either on quenching or at cold-working. The content should preferably be kept below 2.5%.

Cobalt is found to enhance the tempering response, especially together with molybdenum. The synergy between cobalt and molybdenum has been found to be high in amounts up to 10% in total. The ductility is slightly reduced with high cobalt and the maximum limit is therefore expected to be the maximum content tested in this work, which is about 9% and in certain cases about 7%. A disadvantage with cobalt is the price. It is also an element which is undesirable at stainless steelworks. With respect to the cost and the stainless metallurgy it is therefore preferable to avoid alloying with cobalt. The content should generally be at the most 5%, preferably at the most 3%. Usually the content of cobolt is max 2%, preferably max 1%.

Thanks to the alloying with molybdenum and copper and when desired also cobalt, all of which enhance the tempering response, there is no need for a variety of precipitation hardening elements such as tantalum, niobium, vanadium and tungsten or combinations thereof. Thus, the content of tantalum, niobium, vanadium and tungsten should usually be at the most 0.2%, preferably at the most 0.1%. Only a comparatively small addition of aluminium and titanium is required. These two elements form precipitation particles during tempering at a comparatively low temperature. 425° C. to 525° C. has been found to be the optimum temperature range. The particles are in this invented steelgrade expected to be of the type $\eta$-$Ni_3Ti$ and $\beta$-NiAl. Depending on the composition of the alloy, it is expected that also molybdenum and aluminium to some extent take part in the precipitation of $\eta$-particles in a way that a mixed particle of the type $\eta$- $Ni_3$ (Ti, Al, Mo) is formed.

During the processing and testing of the trial-alloys a distinct maximum limit for titanium has been determined to be about 1.4%, often about 1.2% and preferably at the most 1.1%. A content of 1.5% titanium or more results in an alloy with low ductility. An addition of minimum 0.4% has been found to be suitable if a tempering response is required and it is expected that 0.5% or more often 0.6% is the realistic minimum if a high response is required. The content should preferably be at the minimum 0.7%. Aluminium is also required for the precipitation hardening. A slight addition up to 0.4% has been tested with the result of increased tempering response and strength, but no reduction of ductility. It is expected that aluminium can be added up to 0.6% often up to 0.55% and in certain cases up to 0.5% without loss of ductility. The minimum amount of aluminium should be 0.05%, preferably 0.1%. If a high hardening response is required the content usually is minimum 0.15%, preferably at least 0.2%.

All the other elements should be kept below 0.5%. Two elements that normally are present in a iron—based steel-Work are manganese and silicon. The raw material for the steel metallurgy most often contains a certain amount of these two elements. It is difficult to avoid them to a low cost and usually they are present at a minimum level of about 0.05%, more often 0.1%. It is however desirable to keep the contents low, because high contents of both silicon and manganese are expected to cause ductility problem. Two other elements that ought to be discussed are sulphur and phosphorus. They are both expected to be detrimental for the ductility of the steel if they are present at high contents. Therefore they should be kept below 0.05%, usually less than 0.04% and preferably less than 0.03%. A steel does always contain a certain amount of inclusions of sulphides and oxides. If machinability is regarded as an important property, these inclusions can be modified in composition and shape by addition of free cutting additives, such as e.g. calcium, cerium and other rare—earth—metals. Boron is an element that preferably can be added if good hot workability is required. A suitable content is 0.0001–0.1%.

To summarize this description, it has been found that an alloy with the following chemistries meets the requirements. The alloy is an iron base material in which the chromium content varies between about 10% to 14% by weight. Nickel content should be kept between 7% to 11%. To obtain high tempering response in combination with high ductility the elements molybdenum and copper should be added and if desired also cobalt. The contents should be kept between 0.5% to 6% of molybdenum, between 0.5% to 4% of copper and up to 9% of cobalt. The precipitation hardening is obtained at an addition of between 0.05 to 0.6% aluminium and between 0.4 to 1.4% titanium. The contents of carbon and nitrogen must not exceed 0.05%, usually not 0.04% and preferably not 0.03%. The remainder is iron. All other elements of the periodic table should not exceed 0.5%, usually not 0.4% and preferably be at the most 0.3%.

It has been found that an alloy according to this description has a corrosion resistance equal to or even better than existing steelgrades used for e.g. surgical needles. It also lends itself to be processed without difficulties. It can also obtain a final strength of about 2500–3000 N/mm or above, which is approximately 500–1000 $N/mm^2$ higher than existing grades used for e.g. surgical needles such as AISI 420 and 420F and also a grade in accordance with U.S. Pat. No. 3,408,178. The ductility is also equal to or better than existing grades in question. The ductility measured as bendability is in comparison with AISI 420 approximately 200% better and in comparison with AISI 420F even more than 500% better. The twistability is also equal to or better than existing grades used for e.g. dental reamers.

The conclusion is that this invented corrosion resistant precipitation hardenable martensitic steel can have a tensile strength of more than 2500 N/mm$^2$, up to about 3500 N/mm$^2$ is expected for the finer sizes, in combination with very good ductility and formability and sufficient corrosion resistance.

In the research for this new steelgrade which would meet the requirements of corrosion resistance and high strength in combination of high ductility, a series of trialmelts were produced and then further processed to wire as will be described below. The purpose was to invent a steel that does not require vacuum-melting or vacuum-remelting and therefore all melts were produced by melting in an air induction-furnace.

In total 18 melts with various chemical compositions were produced in order to optimize the composition of the invented steel. Some melts have a composition outside the invention in order to demonstrate the improved properties of the invented steel in comparison with other chemical compositions, such as a grade in accordance with U.S. Pat. No. 3,408,178. The trial melts were processed to wire in the following steps. First they were melted in an air-induction furnace to 7" ingot. Table I shows the actual chemical composition of each of the trialmelts tested for various performances. The composition is given in weight % measured as heat analysis. As can be seen, the chromium and nickel contents are kept at about 12 and 9% respectively. The reason for this is that it is known that this combination of chromium and nickel in a precipitation hardenable martensitic stainless steel means that the steel will have a good basic corrosion resistance, good basic toughness and the ability to transform into martensite either by cooling after heat-treatment in the austenitic region or at cold deformation of the material, such as wire drawing. The condition under which the martensite will be formed, on cooling or at cold deformation, will be further pointed out when the material properties for the processed wire are described below. The elements reported in Table I have all been varied for the purpose of the invention with iron as the remainder. Elements not reported have all been limited to maximum 0.5% for these trialmelts.

The ingots were all subsequently forged at a temperature of 1160°–1180° C. with a soaking time of 45 min to size ϕ87 mm in four steps, 200×200–150×150–100×100–ϕ87 mm. The forged billets were water quenched after the forging. All melts were readily forgeable, except for one, No 16, which cracked heavily and could not be processed further. As can be seen in Table I this melt was the one with all contents for the varied elements at highest level within the tested compositions. It can therefore be stated that a material with a combination of alloying elements in accordance with alloy number 16 does not correspond to the purpose of the research and the combined contents are therefore at a distinct maximum limit. Next step in the process was extrusion which was performed at temperatures between 1150°–1225° C. followed by air-cooling. The resulting sizes of the extruded bars were 14.3, 19.0 and 24.0 mm. The size varies because the same press-power could not be used for the whole series of extrusion. The extruded bars were thereafter shaved down to 12.3, 17.0 and 22.0 mm respectively. The heavy sized bars were now drawn down to 13.1 mm and thereafter annealed. The annealing temperature varied between 1050° C. and 1150° C. depending on the contents of molybdenum and cobalt. The more molybdenum and cobalt, the higher temperature was used, because it was desired to anneal the trialmelts in the austenitic region in order to, if possible, form martensite on cooling. The bars were air-cooled from the annealing temperature.

One basic requirement of the invented steel is corrosion resistance. In order to test the corrosion resistance, the heats were divided into six different groups depending on the content of molybdenum, copper and cobalt. The six heats were tested in both annealed and tempered condition. The tempering was performed at 475° C. and 4 hours of age. A test of critical pitting corrosion temperature (CPT) was performed by potentiostatic determinations in NaCl-solution with 0.1% $Cl^-$ and a voltage of 300 mV. The test samples KO-3 were used and six measurements each were performed. A test of general corrosion was also performed. A 10% $H_2SO_4$-solution was used for the testing at two different temperatures, 20° or 30° C. and 50° C. Test samples of size 10×10×30 mm were used.

Results from the corrosion tests are presented in Table II. Test samples from two of the heats, alloys No 2 and 12, showed defects and cracks in the surface and therefore all results from these two have not been reported in the table. The results from the general corrosion in 20° C. and 30° C. show that all these heats are better than e.g. grades AISI 420 and AISI 304, both of which have a corrosion rate of >1 mm/year at these temperatures. The CPT-results are also very good. They are better than or equal to e.g. grades AISI 304 and AISI 316.

It is therefore concluded that the alloys described in this invention fulfil the requirements of corrosion resistance.

The annealed bars in size 13.1 mm together with the extruded bars in size 12.3 mm were then drawn to the testsize 0.992 mm via two annealing steps in ϕ8.1 mm and ϕ4.0 mm. The annealings were also here performed in the temperature range 1050°–1150° C. and with a subsequent air-cooling. All melts performed well during wire-drawing except for two, No 12 and 13. These two melts were brittle and cracked heavily during drawing. It was found that these two were very sensitive to the used pickling-method after the annealings. To remove the oxide, a hot salt-bath was used, but this salt-bath was very aggressive to the grain-boundaries in the two melts No 12 and 13. No 12 cracked so heavily that no material could be produced all the way to final size. Melt No 13 could be produced all the way, but only if the salt-bath was excluded from the pickling step, which resulted in an unclean surface. Compared with the other melts, these two have one thing in common and that is the absence of molybdenum. It is obvious that molybdenum makes these grades of precipitation hardenable martensitic stainless steel more ductile and less sensitive to production methods.

If the two crack-sensitive heats are compared with each other, it can be seen that the most brittle one has a much higher titanium-content than the other. From this result and the fact that the melt that had to be scrapped during forging because of cracks also had a high titanium-content, it can be concluded that a high titanium-content makes the material inflexible regarding production methods and more susceptible to cracking.

These two heats susceptible to cracking, are both corresponding to the earlier mentioned U.S. Pat No. 3,408,178.

In order to test the material in two different conditions the wire-lots were divided in two parts, one of which was annealed at 1050° C. and the other remained cold-worked. The annealed wire-lots were quenched in water jackets.

A high strength in combination with good ductility are essential properties for the invented grade. A normal way of increasing the strength is by cold working, which induces dislocations in the structure. The higher dislocation density, the higher strength. Depending on the alloying, also martensite can be formed during cold working. The more martensite, the higher strength. For a precipitation hardening grade it is also possible to increase the strength by a tempering performed at relatively low temperatures. During the tempering there will be a precipitation of very fine particles which strengthen the structure.

To start with, the trialmelts were investigated regarding ability to form martensite. Martensite is a ferromagnetic phase and the amount of magnetic phase was determined by measuring the magnetic saturation $\sigma_s$ with a magnetic balance equipment.

The formula $$\% \text{ M. magnetic phase} = \frac{\sigma_s 100}{\sigma_n}$$

was used, in which $^{94}$m was determined by $$^{94}m=217.75-12.0*C-—2.40*Si-1.90*Mn-3.0*P-7.0*S-3.0Cr-1.2*Mo-6.0*N-2.6*Al$$

By structure samples it was determined that no ferrite was present and therefore consequently % M is equal to % martensite.

Both annealed and cold worked wire were tested and Table III shows the result. Some of the alloys do not form martensite on cooling, but they all transform into martensite during cold working.

In order to be able to optimize strength and ductility the hardening response during tempering of the trial melts was investigated. Series of tempering at four different temperatures and two different aging times were performed between 375° C. and 525° C. and aging time 1 and 4 hours followed by air cooling. The tensile strength and the ductility were tested afterwards. The tensile testing was performed in two different machines, both of the fabricate Roell & Korthaus, but with different maximum limit, 20 KN and 100 KN. Results from two tests were registered and the mean value from those was reported for evaluation. The ductility was tested as bendability and twistability. Bendability is an important parameter for e.g. surgical needles. The bendability was tested by bending a short wire sample of 70 mm length in an angle of 60° over an edge with radius=0.25 mm and back again. This bending was repeated until the sample broke. The number of full bends without breakage was registered and the mean value from three bend-test was reported for evaluation. Twistability is an important parameter for e.g. dental reamers and it was tested in an equipment of fabricate Mohr & Federhaff A. G., specially designed for testing of dental reamer wire. The used clamping length was 100 mm.

The tensile strength (TS) in annealed and drawn condition is shown in Table IVa and b. In the tables there are also reported the maximum obtained strength with the belonging tempering performance in temperature and aging time. With regard to both strength and ductility also an optimized tempering performance has been determined. Both the strength and aging temperature and time are reported. The response in both the maximum and optimized tempering performances has also been calculated as the increase in strength.

The ductility results for both annealed and drawn condition are reported in Table Va and Vb. The measured bendability and twistability for the corresponding maximum and optimized strength are reported.

To fully understand the influence of composition on the properties of the invented precipitation hardenable martensitic stainless steel it is convenient to compare results element by element.

The basic alloying of 12% Cr and 9% Ni is obviously suitable for the invented grade. As shown above, this combination results in sufficient corrosion resistance and the ability of the material to transform to martensite either by quenching or by cold working.

To be able to optimize the composition of the invented grade and also to find realistic limits, the composition was varied between 0.4–1.6% titanium, 0.0–0.4% aluminium, 0.0–4.1% molybdenum, 0.0–8.9% cobalt and finally 0.0–2.0% copper.

Both titanium and aluminium are expected to take part in the hardening of the invented steel by forming particles of the type $\eta$-$Ni_3Ti$ and $\beta$-NiAl during tempering. $\eta$-$Ni_3Ti$ is an intermetallic compound of hexagonal crystal structure. It is known to be an extremely efficient strengthener because of its resistance to overaging and its ability to precipitate in 12 different directions in the martensite. NiAl is an ordered bcc-phase with a lattice parameter twice that of martensite, $\beta$, which is known to show an almost perfect coherency with martensite, nucleates homogeneously and therefore exhibits an extremely fine distribution of precipitates that coarsen slowly.

The role of titanium has to some extent been discussed above. Neither of the two alloys with the highest titanium content have been able to be processed to fine wire. They have both shown a susceptibility to cracking during forging and drawing. It has been stated that the invented grade should be easy to process and therefore these two alloys have pointed out the acceptable maximum titanium content to be 1.5% and preferably somewhat lower. However, for contents below 1.5%, it is obvious that a high titanium content is preferable if a high strength is required. The tables above can be studied for alloy No 2, 3 and 4, which have the same alloying with the exception of titanium. They have all transformed on quenching to a high amount of martensite, but the higher the titanium, the less martensite is formed. The lower martensite content in the alloy with high titanium reduces the tempering response for this alloy in the annealed condition. For the other two alloys with approximately the same martensite content it is obvious that titanium increases the tempering response and gives a higher final strength. The higher titanium the higher is also the work hardening rate during drawing. The tempering response in drawn condition is approximately the same. The final strength is therefore higher for increased titanium and a final strength of 2650 N/mm$^2$ is possible for a titanium content of 1.4%. For the optimized tempering treatments it can be seen that all three alloys have acceptable ductility in annealed condition. It is obvious that a high titanium content reduces the bendability but improves the twistability in the drawn and aged condition.

The role of aluminium can be studied in alloys No. 2, 7, 8 and 17. They have approximately the same basic alloying with the exception of aluminium. The alloy with low amount of aluminium has also somewhat lower content of titanium and the one with high amount of aluminium has also somewhat higher content of titanium than the others. There is a clear tendency that the higher the aluminium content is, the higher is also the tempering response in both annealed and drawn condition. The strength in drawn condition can be up to 2466 N/mm$^2$ after an optimized tempering. The bendability is slowly decreasing for higher contents of aluminium after an optimized tempering in annealed condition. The twistability is varying but at high levels. In drawn and tempered material, both the bendability and twistability are varying without a clear tendency. However, the one with high amount of aluminium shows good results in both strength and ductility. The role of aluminium can also be studied in alloy No 5 and 11. They both have a higher content of molybdenum and cobalt, but differ in aluminium. They both have a very low tempering response and strength in annealed condition, because of the absence of martensite. In drawn condition they both show a very high tempering response, up to 950 N/mm$^2$. The one with higher amount of aluminium shows the highest increase in strength. The final strength is as high as 2760 N/mm$^2$ after an optimized tempering which results in acceptable ductility. The ductility in drawn and aged condition is approximately the same for the two alloys.

The role of molybdenum and cobalt have briefly been discussed above and this can be further studied in alloy No 2, 5 and 6. It can be seen in the tables that only the alloy with low amounts of molybdenum and cobalt gets a tempering response in annealed condition. This is explained by the absence of martensite in the two alloys with higher amounts of molybdenum and cobalt. In drawn condition it is the opposite. A high level of molybdenum and cobalt results in an extremely high tempering response, up to 1060 N/mm$^2$ maximum and in a optimized tempering still as high as 920 N/mm$^2$. A final strength of 3060 N/mm$^2$ is the maximum and 2920 N/mm$^2$ the optimum with regard to ductility. It is obvious that an increase of both molybdenum and cobalt is more effective in enhancing the tempering response than an increase of cobalt only. The ductility in drawn and tempered condition is acceptable and with regard to the strength even very good, especially for the medium high alloy.

The role of copper can be studied in alloy 2 and 15, which have the same alloying with the exception of copper. The behaviour of alloy 15 must however be discussed before the comparison. When this alloy was investigated in annealed condition, it was found that the tempering response varied a lot in different positions of the tempered coil. This phenomenon is most probably explained by a varying amount of martensite within the quenched wire coil. The conclusion is that the composition of this alloy is on the limit for martensite transformation on quenching. In the tables this has given the somewhat confusing result of 0.10% martensite and yet a high tempering response. The properties should therefore only be compared in drawn condition. It is obvious that a high copper content increases the tempering response drastically and a final strength of 2520 N/mm$^2$ is the result in the optimized tempering. The bendability and twistability are both very good in the drawn and tempered condition for the alloy with high copper content.

From the results so far it can be concluded that molybdenum, cobalt and copper activate the precipitation of Ti and Al-particles during tempering if the structure is martensitic. Different compositions of these elements can be studied in alloy 8, 13 and 14, which all have the same aluminium and titanium contents. The alloy with no molybdenum or cobalt but high amount of copper showed brittleness in annealed condition for several tempering performances. For some of them, however, ductility could be measured. This alloy showed the highest tempering response of all trial melts in annealed condition, but also the worst bendability. Furthermore, this alloy also has the lowest work hardening rate. The tempering response is high also in drawn condition, but the final strength is low, only 2050 N/mm$^2$ after the optimized tempering and the ductility in this condition is therefore one of the best. The alloy with high contents of molybdenum and copper but no cobalt does not form martensite on quenching and consequently the tempering response is very low. The tempering response in drawn condition is high and results in a final optimized strength of 2699 N/mm$^2$. The ductility is also good. The last alloy with no copper but both molybdenum and cobalt gets a high tempering response in annealed condition, but with low bendability. The tempering response is lower in drawn condition. The final optimized strength is 2466 N/mm$^2$ and the ductility is low compared with the other two.

Thus, it can be concluded that both titanium and aluminium are beneficial to the properties. Titanium up to 1.4% increases the strength without an increased susceptibility to cracking. The material also lends itself to be processed without difficulties. Aluminium is here tested up to 0.4%. An addition of only 0.1% has been found to be sufficient for an extra 100–150 N/mm$^2$ in tempering response and is therefore preferably the minimum addition. An upper limit has however not been found. The strength increases with high content of aluminium, but without reducing the ductility. Probably, an amount up to 0.6% would be realistic in an alloy with titanium added up to 1.4%, without a drastic loss of ductility. It can also be concluded that copper strongly activates the tempering response without reducing the ductility. Copper up to 2% has been tested. No disadvantage with higher amounts of copper has been found, with the exception of the increased difficulty to transform to martensite on quenching. With higher copper content than 2% a cold working must be performed before tempering. Copper in contents up to 4% is probably possible to add to this precipitation hardenable martensitic steel. Molybdenum is evidently required for this basic composition. Without an addition of molybdenum the material is very susceptible to both cracking during processing and brittleness after tempering in annealed condition, Molybdenum contents up to 4.1% have been tested. A high amount of molybdenum reduces the ability to form martensite on quenching. Otherwise, only benefits have been registered, i e an increased strength without reduction of ductility. The realistic limit for molybdenum is the content at which the material will not be able to form martensite at cold-working. Contents up to 6% would be possible to use for this invented steel. Cobalt together with molybdenum strongly increases the tempering response. A slight reduction of ductility is however the result with a content near 9%.

In the manufacture of medical and dental as well as spring or other applications, the alloy according to the invention is used in the making of various products such as wire in sizes less than ϕ15 mm, bars in sizes less than ϕ70 mm, strips in sizes with thickness less than 10 mm, and tubes in sizes with outer diameter less than 450 mm and wall-thickness less than 100 mm.

TABLE I

| Alloy number | Heat number | Cr | Ni | Mo | Co | Cu | Al | Ti |
|---|---|---|---|---|---|---|---|---|
| 1 | 654519 | | | | | | | |
| 2 | 654529 | 11.94 | 8.97 | 2.00 | 2.96 | .014 | .10 | .88 |
| 3 | 654530 | 11.8 | 9.09 | 2.04 | 3.01 | .013 | .12 | .39 |
| 4 | 654531 | 11.9 | 9.09 | 2.04 | 3.02 | .013 | .13 | 1.43 |
| 5 | 654532 | 11.8 | 9.10 | 4.01 | 5.85 | .012 | .13 | .86 |
| 6 | 654533 | 11.8 | 9.14 | 4.04 | 8.79 | .011 | .12 | .95 |
| 7 | 654534 | 11.9 | 9.12 | 2.08 | 3.14 | .013 | ≦.003 | .75 |
| 8 | 654535 | 11.9 | 9.13 | 2.03 | 3.04 | .014 | .39 | 1.04 |
| 9 | 654536 | | | | | | | |
| 10 | 654537 | | | | | | | |
| 11 | 654543 | 11.9 | 9.14 | 4.09 | 5.97 | .014 | .005 | .86 |
| 12 | 654546 | 11.8 | 9.08 | <.01 | <.010 | 2.03 | .006 | 1.59 |
| 13 | 654547 | 11.9 | 9.13 | .01 | ≦.010 | 2.03 | .35 | 1.04 |
| 14 | 654548 | 11.7 | 9.08 | 4.08 | ≦.010 | 2.02 | .35 | 1.05 |
| 15 | 654549 | 11.9 | 9.09 | 2.10 | 3.05 | 2.02 | .14 | .93 |
| 16 | 654550 | 11.6 | 9.10 | 4.06 | 8.87 | 2.02 | .31 | 1.53 |
| 17 | 654557 | 11.83 | 9.12 | 2.04 | 3.01 | .012 | .24 | .88 |
| 18 | 654558 | | | | | | | |

TABLE II

| | Annealed condition | | | | Aged condition | | | |
|---|---|---|---|---|---|---|---|---|
| | CPT | General | Corrosion (mm/year) | | CPT | General | Corrosion (mm/year) | |
| Alloy | (° C.) | 20° C. | 30° C. | 50° C. | (° C.) | 20° C. | 30° C. | 50° C. |
| 2 | 71 ± 15 | — | — | — | 68 ± 2 | — | — | — |
| 6 | 90 ± 4 | 0.2 | — | 3.9 | 32 ± 7 | 0.2 | — | 7.1 |
| 11 | 94 ± 2 | 0.5 | — | 13.5 | 24 ± 3 | 0.8 | — | 17.8 |
| 12 | 43 ± 13 | 0.6 | — | 6.2 | — | — | — | — |
| 14 | 82 ± 7 | — | 0.7 | 4.1 | 57 ± 5 | — | 0.1 | 2.0 |
| 15 | 42 ± 18 | 0.6 | — | 7.5 | 27 ± 5 | 0.3 | — | 6.0 |

TABLE III

| Alloy | Annealed condition % M | Cold worked condition % M |
|---|---|---|
| 2 | 80 | 90 |
| 3 | 86 | 90 |
| 4 | 67 | 86 |
| 5 | .01 | 87 |
| 6 | .01 | 85 |
| 7 | 80 | 90 |
| 8 | 79 | 88 |
| 11 | 1.4 | 88 |

TABLE III-continued

| Alloy | Annealed condition % M | Cold worked condition % M |
|---|---|---|
| 12 | — | — |
| 13 | 79 | 81 |
| 14 | 1.6 | 83 |
| 15 | .10 | 86 |
| 16 | — | — |
| 17 | 77 | 89 |

TABLE IVa

| Alloy | Annealed TS ($N/mm^2$) | Aged max TS ($N/mm^2$) | Aged optimized TS ($N/mm^2$) | Max response TS ($N/mm^2$) | Optimized response TS ($N/mm^2$) | Aging ° C./h max | Aging ° C./h optimized |
|---|---|---|---|---|---|---|---|
| 2 | 1040 | 1717 | 1665 | 677 | 625 | 475/1 | 525/1 |
| 3 | 1032 | 1558 | 1558 | 526 | 526 | 475/4 | 475/4 |
| 4 | 1063 | 1573 | 1573 | 510 | 510 | 525/1 | 525/1 |
| 5 | 747 | 779 | 779 | 32 | 32 | 475/4 | 475/4 |
| 6 | 805 | 872 | 1872 | 67 | 67 | 475/4 | 475/4 |
| 7 | 988 | 1648 | 1527 | 660 | 539 | 475/4 | 525/1 |
| 8 | 1101 | 1819 | 1793 | 718 | 692 | 475/4 | 475/1 |
| 11 | 671 | 708 | 708 | 37 | 37 | 525/4 | 525/4 |
| 12 | — | — | — | — | — | — | — |
| 13 | 1056 | 1910 | 1771 | 854 | 715 | 475/4 | 525/1 |
| 14 | 821 | 867 | 867 | 46 | 46 | 525/4 | 425/4 |
| 15 | 732 | 1379 | 1379 | 647 | 647 | 425/4 | 425/4 |
| 16 | — | — | — | — | — | — | — |
| 17 | 1000 | 1699 | 1699 | 699 | 699 | 475/4 | 475/4 |

TABLE IVb

| Alloy | Drawn TS ($N/mm^2$) | Aged max TS ($N/mm^2$) | Aged optimized TS ($N/mm^2$) | Max response TS ($N/mm^2$) | Optimized response TS ($N/mm^2$) | Aging ° C./h max | Aging ° C./h optimized |
|---|---|---|---|---|---|---|---|
| 2 | 2012 | 2392 | 2345 | 380 | 333 | 425/1 | 475/4 |
| 3 | 1710 | 2080 | 2040 | 370 | 330 | 425/4 | 475/1 |
| 4 | 2280 | 2650 | 2650 | 370 | 370 | 475/1 | 475/1 |
| 5 | 1930 | 2880 | 2760 | 950 | 830 | 475/4 | 425/4 |
| 6 | 2000 | 3060 | 2920 | 1060 | 920 | 475/4 | 425/4 |
| 7 | 2282 | 2392 | 2334 | 110 | 52 | | 425/1 |
| 8 | 2065 | 2532 | 2466 | 467 | 401 | 475/1 | 475/4 |
| 11 | 1829 | 2635 | 2546 | 806 | 717 | 525/4 | 425/4 |
| 12 | — | — | — | — | — | — | — |
| 13 | 1370 | 2190 | 2050 | 820 | 680 | 425/4 | 475/4 |
| 14 | 1910 | 2699 | 2699 | 789 | 789 | 475/4 | 475/4 |
| 15 | 1780 | 2610 | 2520 | 830 | 740 | 425/1 | 475/1 |

TABLE IVb-continued

| Alloy | Drawn TS ($N/mm^2$) | Aged max TS ($N/mm^2$) | Aged optimized TS ($N/mm^2$) | Max response TS ($N/mm^2$) | Optimized response TS ($N/mm^2$) | Aging ° C./h max | Aging ° C./h optimized |
|---|---|---|---|---|---|---|---|
| 16 | — | — | — | — | — | — | — |
| 17 | 1829 | 2401 | 2401 | 572 | 572 | 475/4 | 475/4 |

TABLE Va

| Alloy | Annealed benda-bility | Aged benda-bility max TS | Aged bendability, optimized TS | Annealed twista-bility | Aged twista-bility max TS | Aged twista-bility, optimi-zed TS |
|---|---|---|---|---|---|---|
| 2 | 5.3 | 2.7 | 3.3 | >189 | 19 | 65 |
| 3 | 4.3 | 5.0 | 5.0 | 85.3 | 14.5 | 14.5 |
| 4 | 4.0 | 3.3 | 3.3 | 81.7 | 37 | 37 |
| 5 | 11.3 | 19.3 | 19.3 | 109.5 | 134.5 | 134.5 |
| 6 | 16.0 | 25.0 | 25.0 | 139.5 | 134 | 134 |
| 7 | 5.3 | 3.0 | 4.0 | 99 | 15 | 45 |
| 8 | 4.7 | 2.3 | 2.7 | 87 | 18 | 19 |
| 11 | 9.7 | 13.7 | 13.7 | >123 | >110 | >110 |
| 12 | — | — | — | — | — | — |
| 13 | 3.3 | 1.0 | 2.3 | 38.5 | 26 | 33.5 |
| 14 | 7.0 | 8.7 | 8.7 | 107 | 88 | 88 |
| 15 | 9.0 | 3.3 | 3.3 | 92 | 25.5 | 25.5 |
| 16 | — | — | — | — | — | — |
| 17 | 5.3 | 3.3 | 3.3 | 142 | 15 | 15 |

TABLE Vb

| Alloy | Drawn benda-bility | Aged benda-bility, max TS | Aged benda-bility, optimized TS | Drawn twista-bility | Aged twista-bility, max TS | Aged twista-bility, optimized TS |
|---|---|---|---|---|---|---|
| 2 | 3.3 | 1.0 | 2.0 | 9 | 8 | 7 |
| 3 | 3.0 | 3.0 | 3.7 | 17.7 | 11.5 | 9 |
| 4 | 1.0 | 1.0 | 1.0 | 5.5 | 26 | 26 |
| 5 | 3.0 | 2.0 | 3.0 | 35.5 | 3 | 22 |
| 6 | 3.7 | 0.0 | 2.3 | 27.3 | 0.0 | 20 |
| 7 | 1.7 | 2.0 | 2.7 | 12 | 19 | 24 |
| 8 | 1.3 | 0.3 | 2.0 | 10 | 2 | 28 |
| 11 | 3.3 | 2.0 | 3.0 | 29 | 5 | 24 |
| 12 | — | — | — | — | — | — |
| 13 | 3.0 | 2.7 | 3.7 | 11.5 | 1.5 | 31 |
| 14 | 2.0 | 3.0 | 3.0 | 12 | 26 | 26 |
| 15 | 4.0 | 2.3 | 4.0 | 16 | 23 | 24 |
| 16 | — | — | — | — | — | — |
| 17 | 2.7 | 3.0 | 3.0 | 8 | 29 | 29 |

I claim:

1. A precipitation hardenable martensitic stainless steel alloy consisting essentially of, in per cent by weight:

about 10% to 14% chromium,
about 7% to 10% nickel,
about 0.5% to 6% molybdenum,
up to about 9% cobalt,
about 0.5% to 4% copper,
about 0.05% to 0.5% aluminium,
about 0.4% to 1.4% titanium,
not exceeding 0.03% carbon and nitrogen,
the content of tantalum, niobium, vanadium and tungsten being at most 0.1%,
with iron as the remainder and the total content, consisting essentially of silicon, manganese and any other element of the periodic table, not exceeding 0.3%.

2. The alloy of claim 1 wherein the amount of cobalt is up to about 6%.

3. The alloy of claim 1 wherein the amount of copper is about 0.5% to 3%.

4. The alloy of claim 1 wherein the amount of molybdenum is between about 0.5% to 4.5%.

5. The alloy of claim 1 wherein the amount of copper is between about 0.5% to 2.5%.

6. The alloy of claim 1 wherein the alloy is used in the manufacture of medical and dental applications.

7. The alloy of claim 1 wherein the alloy is used in the manufacture of spring applications.

8. The alloy of claim 1 wherein the alloy is used in the production of wire in sizes less than ϕ15 mm.

9. The alloy of claim 1 wherein the alloy is used in the production of bars in sizes less than ϕ70 mm.

10. The alloy of claim 1 wherein the alloy is used in the production of strips in sizes with thickness less than 10 mm.

11. The alloy of claim 1 wherein the alloy is used in the production of tubes in sizes with outer diameter less than 450 mm and wall-thickness less than 100 mm.

12. The alloy of claim 2 wherein the amount of copper is about 0.5% to 3%.

13. The alloy of claim 2 wherein the amount of molybdenum is between about 0.5% to 4.5%.

14. The alloy of claim 3 wherein the amount of molybdenum is between about 0.5% to 4.5%.

15. The alloy of claim 12 wherein the amount of molybdenum is between about 0.5% to 4.5%.

16. The alloy of claim 2 wherein the amount of copper is between 0.5% to 2.5%.

17. The alloy of claim 3 wherein the amount of copper is between 0.5% to 2.5%.

18. The alloy of claim 4 wherein the amount of copper is between 0.5% to 2.5%.

19. The alloy of claim 12 wherein the amount of copper is between 0.5% to 2.5%.

20. The alloy of claim 15 wherein the amount of copper is between 0.5% to 2.5%.

*21. A precipitation hardenable, martensitic stainless steel alloy consisting essentially of, in percent by weight:*

*about 10% to 14% chromium,*
*about 7% to 10% nickel,*
*about 0.5% to 6% molybdenum,*
*up to about 9% cobalt,*
*about 0.5% to 4% copper,*
*about 0.05% to 0.5% aluminum,*
*about 0.4% to 1.4% titanium,*
*not exceeding 0.03% carbon and nitrogen,*
*the content of tantalum, niobium, vanadium, and tungsten being at most 0.1%,*
*with iron as the remainder and the total content, consisting essentially of silicon, manganese and any other element of the periodic table, not exceeding 0.4%.*

*22. The alloy of claim 21 wherein the amount of cobalt is up to about 6%.*

*23. The alloy of claim 21 wherein the amount of copper is about 0.5% to 3%.*

*24. The alloy of claim 21 wherein the amount of molybdenum is between about 0.5% to 4.5%.*

*25. The alloy of claim 21 wherein the amount of cooper is between about 0.5% to 2.5%.*

*26. The alloy of claim 21 wherein the alloy is used in the manufacture of medical and dental applications.*

*27. The alloy of claim 21 wherein the alloy is used in the manufacture of spring applications.*

*28. The alloy of claim 21 wherein the alloy is used in the production of wire in sizes less than ϕ15 mm.*

*29. The alloy of claim 21 wherein the alloy is used in the production of bars in sizes less than ϕ70 mm.*

*30. The alloy of claim 21 wherein the alloy is used in the production of strips in sizes with thickness less than 10 mm.*

*31. The alloy of claim 21 wherein the alloy is used in the production of tubes in sizes with outer diameter less than 450 mm and wall-thickness less than 100 mm.*

*32. The alloy of claim 22 wherein the amount of copper is about 0.5% to 3%.*

*33. The alloy of claim 22 wherein the amount of molybdenum is between about 0.5% to 4.5%.*

*34. The alloy of claim 23 wherein the amount of molybdenum is between about 0.5% to 4.5%.*

*35. The alloy of claim 32 wherein the amount of molybdenum is between about 0.5% to 4.5%.*

*36. The alloy of claim 22 wherein the amount of copper is between 0.5% to 2.5%.*

*37. The alloy of claim 23 wherein the amount of copper is between 0.5% to 2.5%.*

*38. The alloy of claim 24 wherein the amount of copper is between 0.5% to 2.5%.*

*39. The alloy of claim 32 wherein the amount of copper is between 0.5% to 2.5%.*

*40. The alloy of claim 35, wherein the amount of cooper is between 0.5% to 2.5%.*

*41. A precipitation hardenable, martensitic stainless steel alloy consisting essentially of, in percent by weight:*

*about 10% to 14% chromium,*

*about 7% to 10% nickel,*

*about 0.5% to 6% molybdenum,*

*up to about 9% cobalt,*

*about 0.5% to 4% copper,*

*about 0.05% to 0.5% aluminum,*

*about 0.4% to 1.4% titanium,*

*not exceeding 0.03% carbon and nitrogen,*

*the content of tantalum, niobium, vanadium, and tungsten being at most 0.1%,*

*with iron as the remainder and the total content, consisting essentially of silicon not exceeding 0.4%, and manganese and any other element of the periodic table not exceeding 0.5%.*

*42. The alloy of claim 41 wherein the amount of cobalt is up to about 6%.*

*43. The alloy of claim 41 wherein the amount of copper is about 0.5% to 3%.*

*44. The alloy of claim 41 wherein the amount of molybdenum is between about 0.5% to 4.5%.*

*45. The alloy of claim 41 wherein the amount of copper is between about 0.5% to 2.5%.*

*46. The alloy of claim 41 wherein the alloy is used in the manufacture of medical and dental applications.*

*47. The alloy of claim 41 wherein the alloy is used in the manufacture of spring applications.*

*48. The alloy of claim 41 wherein the alloy is used in the production of wire in sizes less than ϕ15 mm.*

*49. The alloy of claim 41 wherein the alloy is used in the production of bars in sizes less than ϕ70 mm.*

*50. The alloy of claim 41 wherein the alloy is used in the production of strips in sizes with thickness less than 10 mm.*

*51. The alloy of claim 41 wherein the alloy is used in the production of tubes in sizes with outer diameter less than 450 mm and wall-thickness less than 100 mm.*

*52. The alloy of claim 42 wherein the amount of copper is about 0.5% to 3%.*

*53. The alloy of claim 42 wherein the amount of molybdenum is between about 0.5% to 4.5%.*

*54. The alloy of claim 43 wherein the amount of molybdenum is between about 0.5% to 4.5%.*

*55. The alloy of claim 52 wherein the amount of molybdenum is between about 0.5% to 4.5%.*

*56. The alloy of claim 42 wherein the amount of copper is between 0.5% to 2.5%.*

*57. The alloy of claim 43 wherein the amount of copper is between 0.5% to 2.5%.*

*58. The alloy of claim 44 wherein the amount of copper is between 0.5% to 2.5%.*

*59. The alloy of claim 52 wherein the amount of copper is between 0.5% to 2.5%.*

*60. The alloy of claim 55, wherein the amount of cooper is between 0.5% to 2.5%.*

* * * * *